(12) United States Patent
Mirsky et al.

(10) Patent No.: US 8,323,000 B2
(45) Date of Patent: Dec. 4, 2012

(54) COMPRESSOR-DRIVER POWER LIMITING IN CONSIDERATION OF ANTISURGE CONTROL

(75) Inventors: Saul Mirsky, West Des Moines, IA (US); Jeff McWhirter, Spring, TX (US); John R. Wolflick, Las Cruces, NM (US)

(73) Assignees: Compressor Controls Corp., Des Moines, IA (US); Conocophillips Company, Houston, TX (US)

( * ) Notice: Subject to any disclaimer, the term of this patent is extended or adjusted under 35 U.S.C. 154(b) by 1199 days.

(21) Appl. No.: 12/144,196

(22) Filed: Jun. 23, 2008

(65) Prior Publication Data

US 2009/0317260 A1 Dec. 24, 2009

(51) Int. Cl.
*F04B 49/03* (2006.01)
(52) U.S. Cl. ........................................... 417/295
(58) Field of Classification Search ............. 417/18, 417/44.11, 280, 295, 423.1, 429
See application file for complete search history.

(56) References Cited

U.S. PATENT DOCUMENTS

| | | | | |
|---|---|---|---|---|
| 4,940,391 | A | * | 7/1990 | Elms et al. .................. 417/12 |
| 5,306,116 | A | * | 4/1994 | Gunn et al. .................. 415/27 |
| 5,743,715 | A | | 4/1998 | Staroselsky |

OTHER PUBLICATIONS

Compressor Controls Series 5 Antisurge Control Application Manual, Publicaiton UM5411 rev. 2.8.0 Dec. 2007—200 pages.

* cited by examiner

*Primary Examiner* — Devon Kramer
*Assistant Examiner* — Bryan Lettman
(74) *Attorney, Agent, or Firm* — Sturm & Fix LLP

(57) ABSTRACT

A control method and apparatus for simultaneously protecting a compression system from driver overpowering and turbocompressor surge. When overpowering is detected, flow rate through the each compressor in the turbocompressor train is reduced by closing an inlet throttling valve at the inlet of each respective compressor stage unless a compressor operating point is sufficiently near surge. In this latter case, the inlet throttling valve is not closed. In this way, overall flow rate through the compressor train is reduced while maintaining adequate flow through compromised stages to avoid surge.

13 Claims, 4 Drawing Sheets

COMPRESSOR-DRIVER POWER LIMITING IN CONSIDERATION OF ANTISURGE CONTROL

CROSS REFERENCE TO RELATED APPLICATIONS

Not applicable.

BACKGROUND OF THE INVENTION

1. Field of the Invention

The present invention relates generally to a control scheme. More particularly the present invention relates to a method and apparatus for reducing a shaft power required to drive a multistage turbocompressor by selectively manipulating throttle valves at the compressor stages' inlets while simultaneously protecting the compressor stages from surge.

2. Background Art

During some modes of operation a load imposed by the process on a single- or multistage compressor may exceed a maximum power available from the driver or drivers. Compressor shutdown may be required to avoid damage to the driver. Shutdown is to be avoided due to its inherent production loss.

A known method to avoid shutdown while still protecting the driver from damage reduces the load on the train by throttling the inlet flow using an inlet throttle valve on each stage of compression.

The present-day scheme of protection calls for reducing the opening of the inlet throttle valves, when present. The anticipated result is a reduction of flow through each of the compressor stages, and a consequent reduction in power consumed by compressor train.

Compressor surge is an unstable operating condition that is to be avoided. Modern control systems provide antisurge protection by calculating an operating point of the compressor and determining a proximity of the operating point to the compressor's surge limit. Antisurge control is explained in the Compressor Controls Series 5 Antisurge Control Application Manual, Publication UM5411 rev. 2.8.0 Dec. 2007, herein incorporated in its entirety by reference.

A surge control line is defined by providing a safety margin to the surge limit. When the compressor's operating point approaches the surge control line, a recycle, or antisurge, valve plumbed in parallel with the compressor is opened to provide sufficient flow to the compressor to keep it safe from surge.

Throttling the inlet flow of a turbocompressor stage operating at or near its surge control line causes that stage's operating point to be driven nearer to surge. When the antisurge control system is actively manipulating the antisurge valve to protect its compressor stage from surge, closing the inlet throttling valve will cause the control system to increase the opening of the antisurge valve to compensate for the reduction of the inlet flow rate. Thus no reduction of shaft power is realized.

There is, therefore, a need for an improved control strategy for the startup of turbocompressors to reduce the loading of the compressor while maintaining the compressor flow out of the unstable, surge region.

BRIEF SUMMARY OF THE INVENTION

An object of the present invention is to provide a method and apparatus for effectively reducing the shaft power required to drive a multistage turbocompressor. It is a further object of the present invention to provide this reduction in shaft power while maintaining the compressor train in a stable operating condition.

The instant invention uses compressor driver power limiting to simultaneously close inlet throttling valves in the train to reduce the overall driver power consumption by the compressor train. All inlet valves are closed in this manner except those valves on compressor stages operating nearer surge than a predetermined distance. Therefore, inlet throttling valves are not closed past the point where the compressor's operating point is at that predetermined distance from surge.

The instant invention can be used for to control any compressor train with one or more stages of compression, where the shaft load must be limited to avoid shutdown, and where suction throttling valves are available. For the purposes of this document, including the claims, the term compressor train is hereby defined as one or more turbocompressors or turbocompressor stages on a single shaft. Shaft power may be provided by one or more drivers such as gas or steam turbines, or electric motors.

The novel features believed to be characteristic of this invention, both as to its organization and method of operation together with further objectives and advantages thereto, will be better understood from the following description considered in connection with the accompanying drawings in which a presently preferred embodiment of the invention is illustrated by way of example. It is to be expressly understood however, that the drawings and examples are for the purpose of illustration and description only, and not intended in any way as a definition of the limits of the invention.

DETAILED DESCRIPTION OF THE INVENTION

Figure 1:
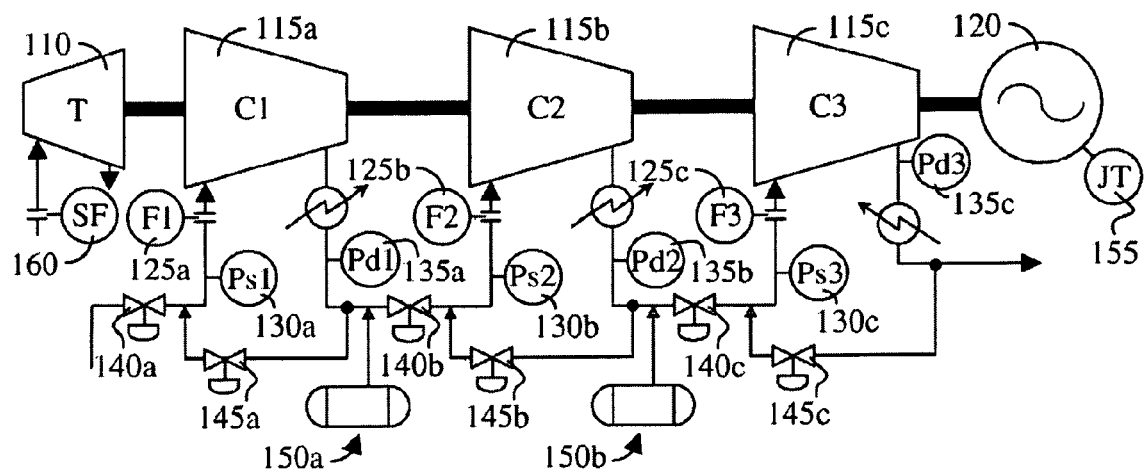
FIG. 1 is a schematic of a compressor train wherein each stage of compression is outfitted with an inlet throttling valve.

A three-stage compressor train is shown, schematically, in FIG. 1. The present invention is useful on compressor trains of any number of compressor stages $115a$-$115c$, and is, therefore, not limited to the three-stage train shown in FIG. 1. Shaft power to drive the compressors $115a$-$115c$ is, in this case, provided by a steam turbine 110 and an electric motor 120.

Instrumentation for monitoring and control comprises flow meter transmitters $125a$-$125c$, suction pressure transmitters 130a-130c, and discharge pressure transmitters 135a-135c for each stage of compression 115a-115c.

The drivers are also instrumented: the electric motor 120 is fitted with an electric current or power transmitter 155 while the steam flow rate into the steam turbine 110 is measured by the steam flow transmitter 160.

Figure 6:
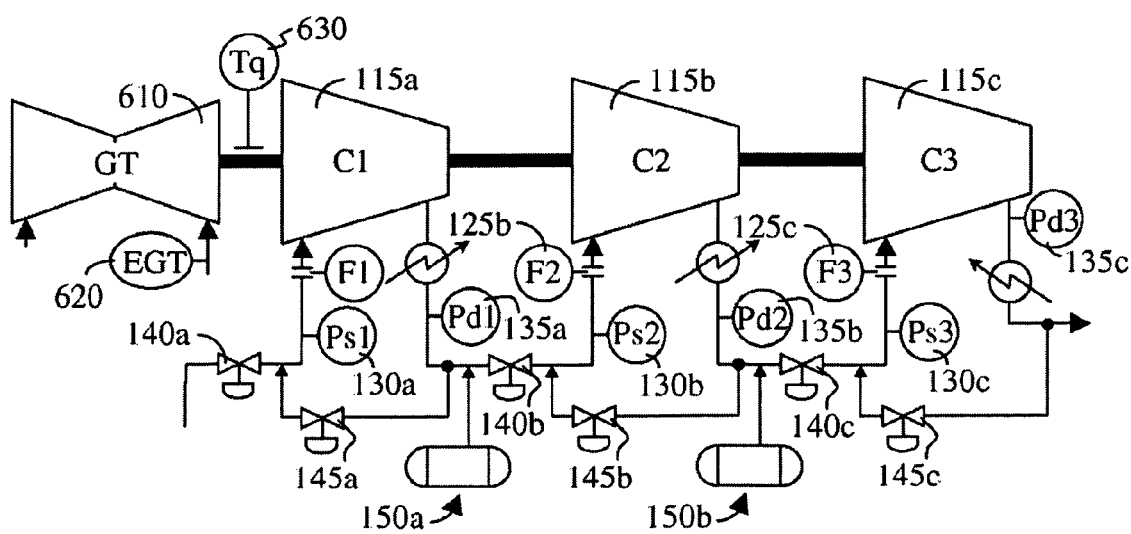
FIG. 6 is a schematic of a compressor train driven by a gas turbine driver.

In FIG. 6, a gas turbine 610 is shown as the driver of the compressor train. Instrumentation on the gas turbine might include an Exhaust Gas Temperature (EGT) transmitter 620 and a shaft torque meter 630.

Each compressor stage 115a-115c is fitted with an inlet throttling valve 140a-140c by which performance or capacity control is effected and load balancing between the individual compressor stages 115a-115c is carried out.

Adequate flow through the compressor stages 115a-115c is provided for antisurge control by manipulating the antisurge valves 145a-145c.

As with many refrigeration compressors, sidestreams 150a-150b are integral to the compression system.

Figure 2:
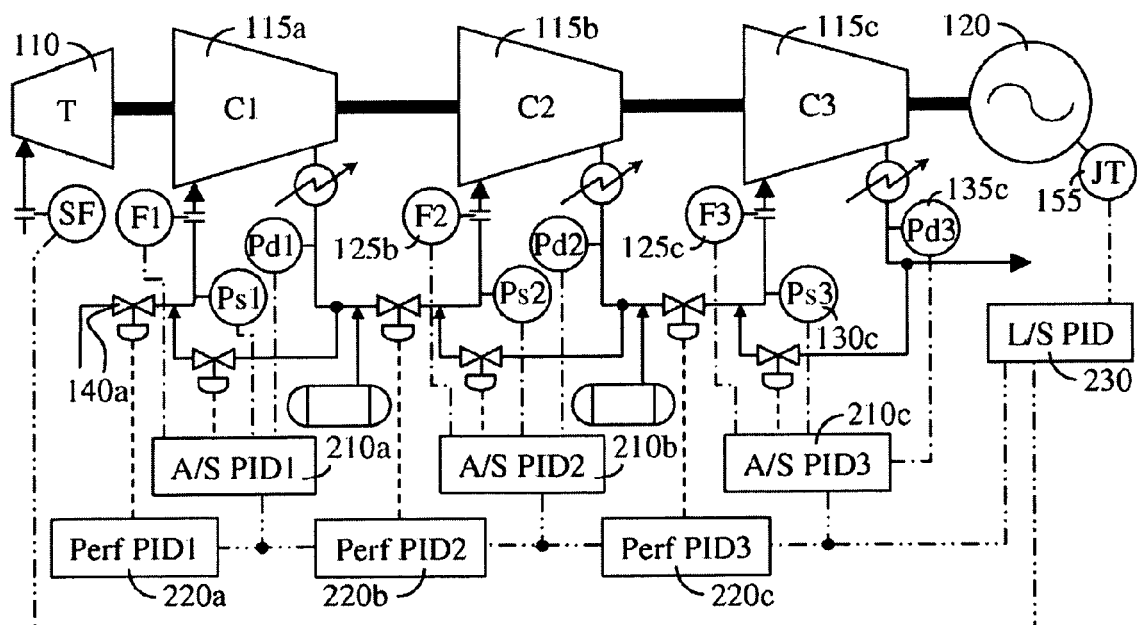
FIG. 2 is a schematic of a compressor train and a control system for the same.

In FIG. 2, the same compressor train as illustrated in FIG. 1 is shown with a control system. Some of the reference numbers shown in FIG. 1 are not shown in FIG. 2 for clarity. A typical control system comprises antisurge controllers 210a-210c and performance controllers 220a-220c for each stage of compression 115a-115c, and a load sharing controller 230.

Into each antisurge controller 210a-210c is inputted signals representing: a flow rate from the flow meter transmitter 125a-125c, a suction pressure from the suction pressure transmitter 130a-130c, and a discharge pressure from the suction pressure transmitter 135a-135c. Other signals may also be provided and the present invention is not limited to any particular set of input signals to the antisurge controllers. The output signal from each of the antisurge controllers 210a-210c is a signal to manipulate the antisurge valve 145a-145c.

The performance controllers 220a-220c manipulate the inlet throttling valves 140a-140c based on a load sharing control scheme such as those disclosed in U.S. Pat. No. 5,743,715, hereby incorporated by reference. The load sharing controller 230 communicates with the performance controllers 220a-220c, causing them to manipulate their respective inlet throttling valves 140a-140c to maintain a process variable at a predetermined set point.

Note that all individual controllers 210a-210c, 220a-220c, 230 are able to communication one with another over a hardwired or wireless network represented by dash-dot-dot lines in FIG. 2. Therefore, when a driver is overpowered—for instance: the electric motor current (or power) exceeds a predetermined upper threshold—the load sharing controller 230 is able to detect that event by comparing the signal from the current (or power) transmitter 155 to the predetermined threshold, and is then able to signal the performance controllers 220a-220c to cause their respective inlet throttling valves 140a-140c to close. Additionally, the performance controllers 220a-220c can receive information from the antisurge controllers 210a-210c regarding the position of their respective compressor's operating points. With this information, each performance controller 220a-220c will determine if and how much to close the inlet throttling valve 140a-140c to simultaneously reduce the electric motor's load and safeguard the compressors 115a-115c from surge.

Figure 3:
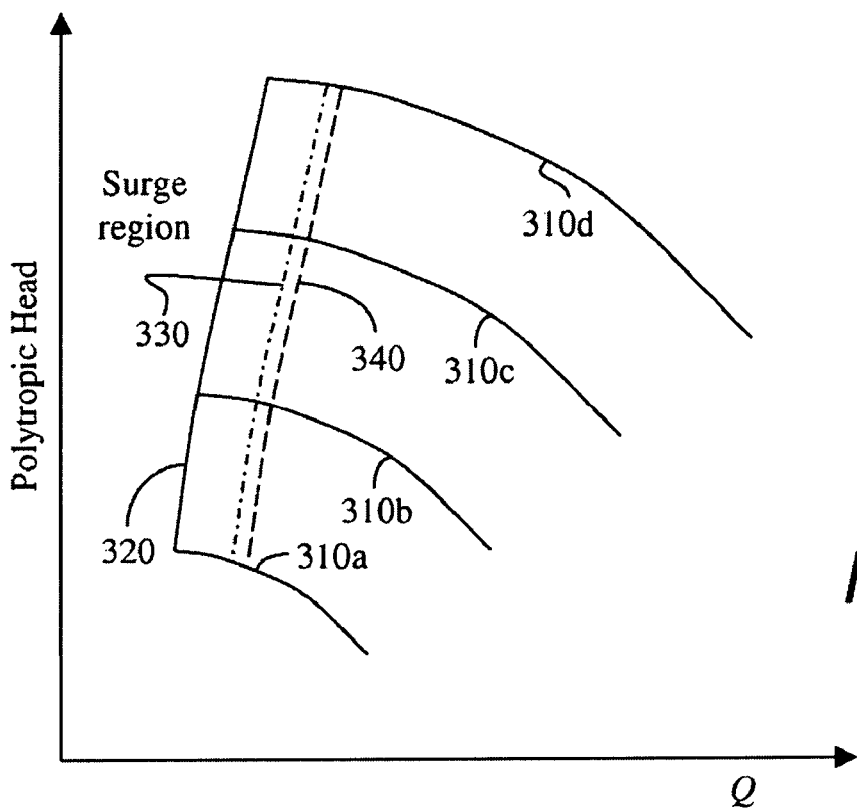
FIG. 3 is a representative compressor performance map in $(Q, H_p)$ coordinates.

A typical compressor performance map in polytropic head vs. Q coordinates is shown in FIG. 3. Here, Q is volumetric flow rate—usually measured at the inlet. The map of FIG. 3 comprises curves of constant rotational speed 310a-310d, a surge limit 320, a surge control line 330, and a power limiting curve 340. The surge limit 320 is the boundary between the surge region and the stable operating region, usually simply referred to as the operating region. The surge control line 330 is a curve set apart from the surge limit 320 by a safety margin, sometimes referred to as the surge margin. The power limiting curve 340 is a curve set apart from the surge control line 330 by a predetermined distance. When the driver is overpowered, the inlet throttling valve 140a-140c of each turbocompressor 115a-115c is ramped closed to the point where the compressor's operating point reaches the power limiting curve 340. In this fashion, the antisurge valve 145a-145c of that particular turbocompressor stage 115a-115c is not forced to open to protect the compressor 115a-115c from surge.

Figure 4:
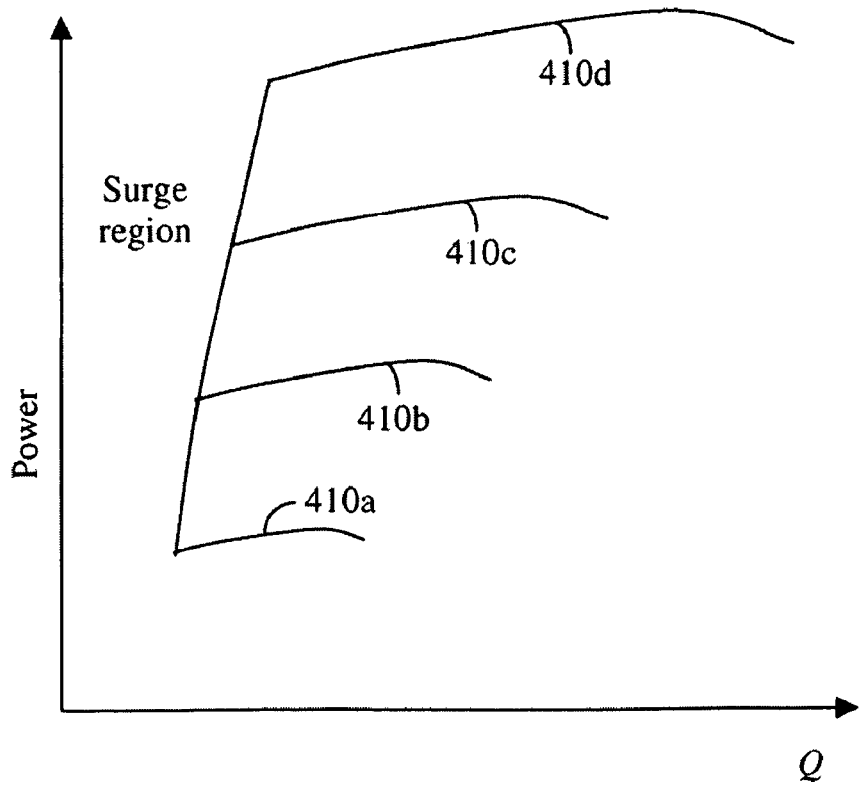
FIG. 4 is a representative compressor performance map in $(Q, \dot{W})$ coordinates.

In FIG. 4, another compressor performance map is shown. Here, the performance curves are in shaft power vs. Q coordinates. Each curve 410a-410d is, again, a line of constant rotational speed. It is clear from the curves of shaft power 410a-410d, at a given rotational speed, the required shaft power decreases as the compressor's operating point moves toward the surge limit 320.

Figure 5:
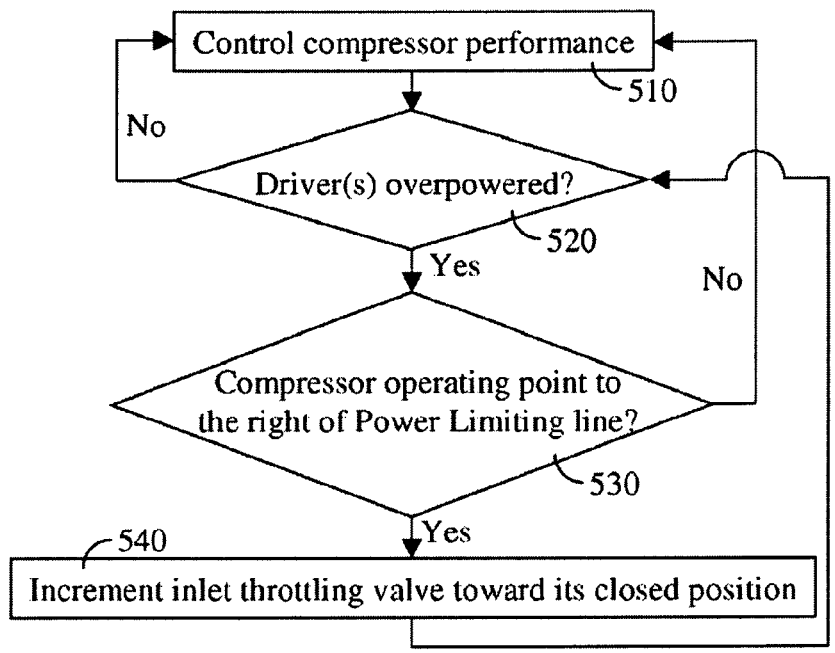
FIG. 5 is a flow diagram illustrating a logic of the control scheme of the instant invention.

In FIG. 5, the control algorithm of the present invention is illustrated in a flow diagram. This diagram may be considered the programmed algorithm in the control system 210a-210c, 220a-220c, 230 shown in FIG. 2. Because the individual controllers 210a-210c, 220a-220c, 230 are able to communicate with one another, any part of the algorithm shown in FIG. 5 may be executed in any particular controller 210a-210c, 220a-220c, 230. Necessary inputs and outputs to each controller function are communicated via the inter-controller communication links.

As is well known in the art, in the usual course of operation, some aspect of performance or capacity control is carried out on the compressors 115a-115c via the manipulation of the inlet throttling valves 140a-140c. This usual mode of operation is indicated in the top block 510 of FIG. 5. The control system 210a-210c, 220a-220c, 230 monitors some aspect or aspects of the driver 110, 120, 610 to determine if the driver 110, 120, 610 is overpowered. Aspects that may be monitored include, but are not limited to: electric motor current, electric motor power, gas turbine exhaust gas temperature, shaft torque, and steam turbine steam flow rate.

When the monitored aspect, or one of the monitored aspects, exceeds a threshold (see FIGS. 7-10), the driver 110, 120, 610 is deemed overpowered, as indicated in the first query block 520. When the query proves true, that is, the driver 110, 120, 610 is overpowered, the algorithm calls for a query of the control system 210a-210c, 220a-220c, 230, in the second query block 530, to determine if each compressor's operating point is to the right of the power limiting curve 340—that is, if it is safe to close the inlet throttling valve 140a-140c. If the result of this query 530 is false, control of the inlet throttling valve 140a-140c remains with the performance controller in block 510.

Whenever the query 530 is true, the opening of the respective throttling valve 140a-140c is reduced in block 540 while continuously or periodically checking if the driver 110, 120, 610 remains overpowered and, if so, if it remains safe to close the inlet throttling valve 140a-140c further. Note that the function illustrated in FIG. 5 is carried out for each of the turbocompressors 115a-115c in the compressor train that has an inlet throttling valve.

Figure 7:
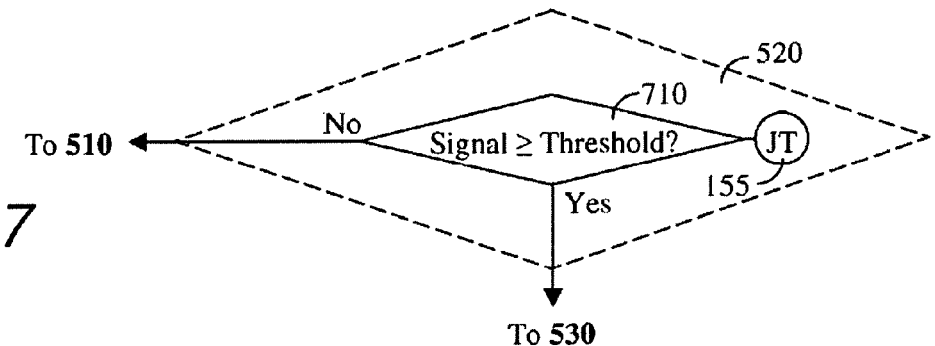
FIG. 7 is a detail of an overpower query using electric motor current or power as the criterion for detecting overpowering.

FIGS. 7-10 clarify the first query block 520 in FIG. 5. In FIG. 7, the criterion used for determining if the electric motor 120 is overpowered is motor current or motor power, according to the signal received from the current or power transmitter 155. The signal received from the transmitter 155 is compared to a threshold value for that signal in a query block 710 to make the determination as to whether or not the driver is overpowered.

Figure 8:
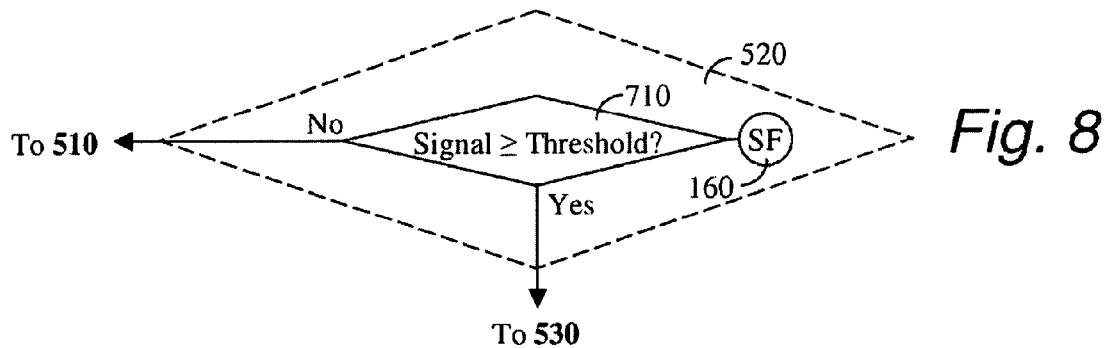
FIG. 8 is a detail of an overpower query using steam turbine steam flow rate as the criterion for detecting overpowering.

In FIG. 8, the criterion used for determining if the steam turbine 110 is overpowered is steam flow rate, according to the signal received from the steam flow rate transmitter 160. The signal received from the transmitter 160 is compared to a threshold value for that signal in a query block 710 to make the determination as to whether or not the driver is overpowered.

Figure 9:
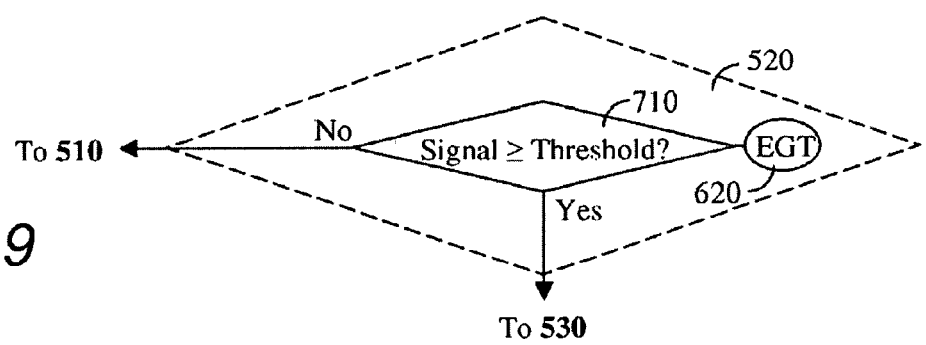
FIG. 9 is a detail of an overpower query using gas turbine exhaust gas temperature as the criterion for detecting overpowering.

In FIG. 9, the criterion used for determining if the gas turbine 610 is overpowered is the exhaust gas temperature, according to the signal received from the exhaust gas temperature transmitter 620. The signal received from the transmitter 620 is compared to a threshold value for that signal in a query block 710 to make the determination as to whether or not the driver is overpowered.

Figure 10:
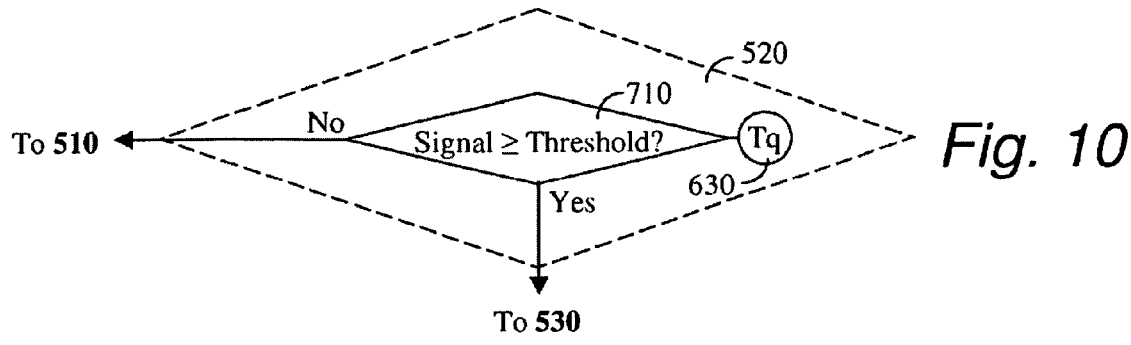
FIG. 10 is a detail of an overpower query using shaft torque as the criterion for detecting overpowering.

In FIG. 10, the criterion used for determining if the driver 110, 120, 610 is overpowered is the shaft torque, according to the signal received from the torque transmitter 630. The signal received from the transmitter 630 is compared to a threshold value for that signal in a query block 710 to make the determination as to whether or not the driver is overpowered.

The above embodiment is the preferred embodiment, but this invention is not limited thereto, nor to the figures and examples given above. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A method of controlling a driver power in a compression system comprising a compressor train including at least one turbocompressor, a turbocompressor inlet throttling valve, and a driver, the method comprising:
   (a) monitoring the driver;
   (b) testing to determine if the driver is overpowered;
   (c) calculating an operating point location for each of the at least one turbocompressors;
   (d) comparing the operating point location to a predetermined location relative to a surge limit for each of the at least one turbocompressors;
   (e) using a comparison of the operating point location to the predetermined location relative to the surge limit to determine if it is safe to close the inlet throttling valve;
   (f) actuating the inlet throttling valve toward a closed position if the driver is determined overpowered and it is safe to close the inlet throttling valve; and
   (g) avoiding actuation of the inlet throttling valve toward the closed position if the driver is determined overpowered and it is not safe to close the inlet throttling valve.

2. The method of claim 1 wherein monitoring the driver comprises sensing a signal chosen from the group consisting of an electric motor current, an electric motor power, a steam turbine steam flow rate, and a gas turbine exhaust gas temperature.

3. The method of claim 1 wherein testing to determine if the driver is overpowered comprises:
   (a) receiving a signal related to a power of the driver; and
   (b) comparing the signal to a threshold value.

4. The method of claim 1 wherein the predetermined location relative to the surge limit comprises a curve a predetermined distance from a surge control line, said surge control line lying a predetermined distance from the surge limit.

5. The method of claim 1 wherein using the comparison of the operating point location to the predetermined location relative to the surge limit to determine if it is safe to close the inlet throttling valve comprises:
   (a) defining the surge control line a predetermined distance from a surge limit;
   (b) defining a power limiting curve a predetermined distance from the surge control line;
   (c) determining a location of the operating point to the power limiting curve;
   (d) determining it is safe to close the inlet throttling valve if the operating point is farther from the surge limit than the power limiting curve; and
   (e) determining it is not safe to close the inlet throttling valve if the operating point is at least as near to the surge limit as the power limiting curve.

6. The method of claim 1 wherein actuating the inlet throttling valve toward the closed position comprises:
   (a) actuating the inlet throttling valve a predetermined increment toward the closed position;
   (b) determining if it is safe to close the inlet throttling valve;
   (c) determining if the driver is overpowered; and
   (d) periodically repeating actuation of the inlet throttling valve the predetermined increment toward the closed position, determining if it is safe to close the inlet throttling valve, and determining if the driver is overpowered until at least one of a determination selected from the group consisting of: if it is safe to close the inlet throttling valve, and if the driver is not overpowered.

7. The apparatus of claim 1 wherein the signal representative of the driver power is a steam turbine steam flow rate.

8. The apparatus of claim 1 wherein the signal representative of the driver power is a gas turbine exhaust gas temperature.

9. An apparatus for controlling a driver power in a compression system comprising:
   (a) a compressor train comprising at least one turbo compressor;
   (b) a turbocompressor inlet throttling valve;
   (c) a driver with which to drive the compressor train;
   (d) a signal representative of the driver power;
   (e) a control system by which the signal representative of the driver power is sensed;
   (f) a test function within the control system to determine if the driver is overpowered;
   (g) a calculation function within the control system to calculate an operating point location for each of the at least one turbocompressors;
   (h) a comparison function within the control system to compare the operating point location to a predetermined location relative to a surge limit for each of the at least one turbocompressors to determine if it is safe to close the inlet throttling valve;
   (i) a determination function within the control system to cause actuation of the inlet throttling valve toward a closed position if the driver is determined overpowered and it is safe to close the inlet throttling valve; and
   (j) a determination function within the control system to avoid actuation of the inlet throttling valve toward the closed position if the driver is determined overpowered and it is not safe to close the inlet throttling valve.

10. The apparatus of claim 9 wherein the signal representative of the driver power is chosen from the group consisting of an electric motor current, an electric motor power, a steam turbine steam flow rate, and a gas turbine exhaust gas temperature.

11. The apparatus of claim 9 wherein the test function within the control system to determine if the driver is overpowered comprises:
(a) an input to receive a signal representing a function of the power of the driver; and
(b) a comparison function to compare the signal to a threshold value.

12. The apparatus of claim 9 wherein the signal representative of the driver power is a steam turbine steam flow rate.

13. The apparatus of claim 9 wherein the signal representative of the driver power is a gas turbine exhaust gas temperature.

* * * * *